United States Patent
Hooton

(10) Patent No.: US 8,172,294 B1
(45) Date of Patent: May 8, 2012

(54) VEHICLE STORAGE SYSTEM

(75) Inventor: Joel S. Hooton, Chesterfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/075,264

(22) Filed: Mar. 30, 2011

(51) Int. Cl.
*B60R 13/00* (2006.01)

(52) U.S. Cl. ............... 296/24.34; 296/37.8; 220/738

(58) Field of Classification Search ........... 296/24.34, 296/37.12, 37.8; 220/737, 738
See application file for complete search history.

(56) References Cited

U.S. PATENT DOCUMENTS

| | | | |
|---|---|---|---|
| 5,618,018 A * | 4/1997 | Baniak | 296/37.12 |
| 5,887,709 A * | 3/1999 | Thompson | 220/737 |
| 6,123,220 A * | 9/2000 | Williams | 220/737 |
| 6,464,100 B2 * | 10/2002 | Canfield | 220/737 |
| 6,651,836 B1 * | 11/2003 | Hofheins et al. | 220/737 |
| 7,597,300 B2 * | 10/2009 | Harada | 220/737 |
| 7,789,265 B2 * | 9/2010 | Kearney et al. | 220/737 |
| 8,011,166 B2 * | 9/2011 | Sheets et al. | 220/737 |
| 2003/0029878 A1 * | 2/2003 | Peitzmeier et al. | 220/737 |
| 2004/0118860 A1 * | 6/2004 | Leopold et al. | 220/737 |
| 2005/0194345 A1 * | 9/2005 | Beggins | 220/737 |
| 2005/0211714 A1 * | 9/2005 | Kazyaka | 220/737 |

* cited by examiner

*Primary Examiner* — Lori Lyjak
(74) *Attorney, Agent, or Firm* — Quinn Law Group, PLLC

(57) ABSTRACT

A storage system includes structure having a surface that at least partially defines a storage compartment. The structure also defines an opening through which the storage compartment is accessible. The storage system further includes a plurality of flexible protuberances extending from the surface into the storage compartment. At least some of the protuberances deform as an object is inserted into the storage compartment through the opening. The deformed protuberances conform to the shape of the object, thereby supporting and restraining the object within the storage compartment.

9 Claims, 3 Drawing Sheets

VEHICLE STORAGE SYSTEM

TECHNICAL FIELD

This invention relates to storage systems for vehicles.

BACKGROUND

Vehicles typically include storage compartments accessible from the passenger compartment for holding the belongings of the driver or passengers. For example, a vehicle may include a glove box (or glove compartment) formed within the instrument panel in front of a passenger seat. A glove box typically includes a door that selectively closes off the glove box from the interior compartment to retain items stored therein. Other storage compartments may include storage boxes formed within a center console.

Cup holders are an example of a specialized storage compartment. Cup holders are typically configured to hold beverage containers that are generally cylindrical. The upper portion of the beverage container remains exposed outside the cup holder for easy access by an occupant of the vehicle.

SUMMARY

A storage system includes structure having a surface that at least partially defines a storage compartment. The structure also defines an opening through which the storage compartment is accessible. The storage system further includes a plurality of flexible protuberances extending from the surface into the storage compartment. At least some of the protuberances deform as an object is inserted into the storage compartment through the opening. The deformed protuberances conform to the shape of the object, thereby supporting and restraining the object within the storage compartment.

The storage system may be used in vehicles to support and restrain objects during movement of the vehicle. Accordingly, a vehicle having a storage system is also provided. The vehicle includes a vehicle body defining an interior compartment. The vehicle also includes structure having a surface that at least partially defines a storage compartment. The structure also defines an opening through which the storage compartment is accessible from the interior compartment. A plurality of flexible protuberances extend from the surface into the storage compartment.

The above features and advantages and other features and advantages of the present invention are readily apparent from the following detailed description of the best modes for carrying out the invention when taken in connection with the accompanying drawings.

DETAILED DESCRIPTION

Figure 1:
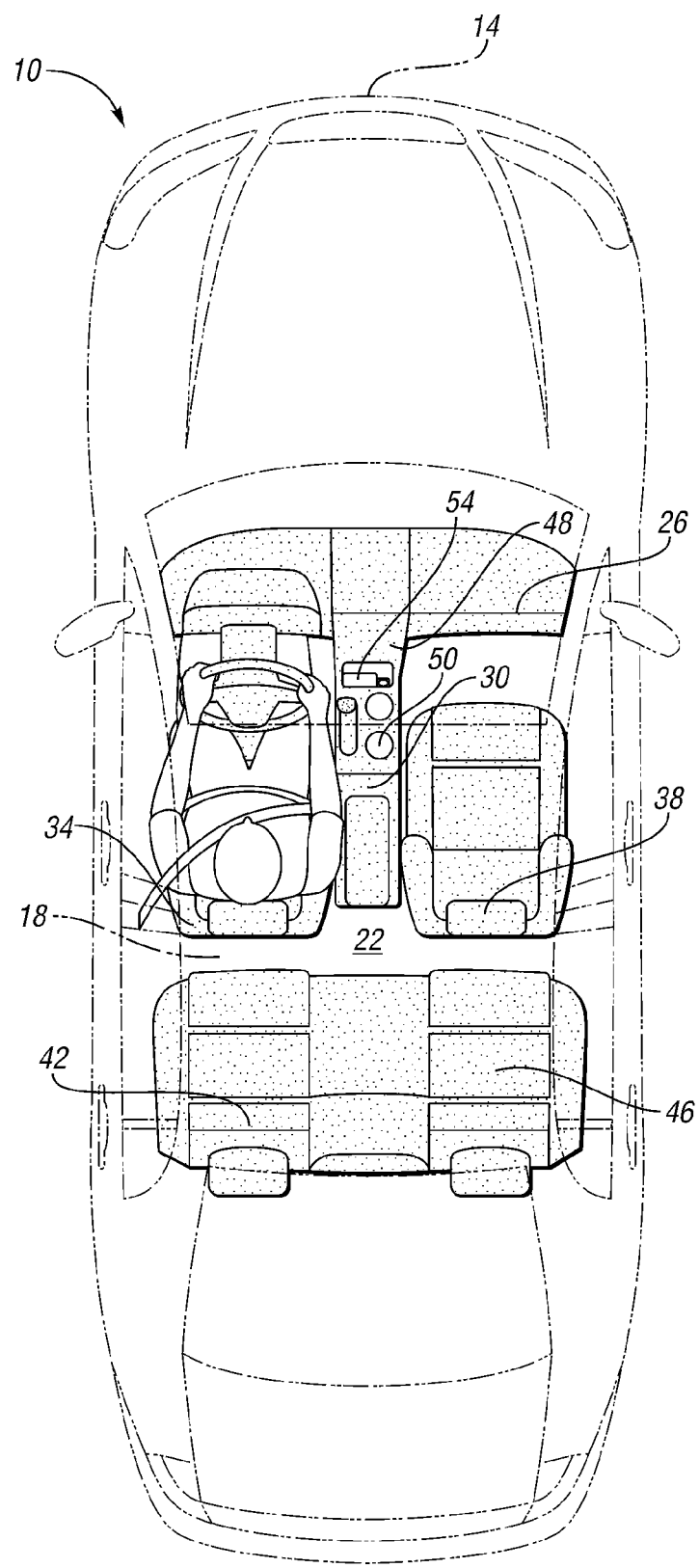
FIG. 1 is a schematic, top view of a vehicle having a center console.

Referring to FIG. 1, a vehicle 10 includes a vehicle body 14. The vehicle body 14 includes a floor 18. The floor 18 cooperates with other vehicle body components to define an interior compartment 22, which, in the embodiment depicted, is a passenger compartment. The vehicle body 14 also includes an instrument panel 26 at the forward end of the interior compartment 22. A center console 30 is inside the interior compartment 22, adjacent to the instrument panel 26 and extending rearward from the instrument panel 26 between a front driver's seat 34 and a front passenger seat 38. The front driver's seat 34 and the front passenger seat 38 are mounted with respect to the floor 18, as understood by those skilled in the art. In the embodiment depicted, two rear passenger seats 42, 46 are mounted with respect to the floor 18 behind the driver's seat 34 and the front passenger seat 38.

The vehicle body 14 includes structure that defines two storage compartments 50, 54. More specifically, and with reference to FIG. 2, wherein like reference numbers refer to like components from FIG. 1, the vehicle body 14 includes a member 56 that defines a cavity 58. In the embodiment depicted, the member 56 is part of the center console 30, and defines a surface 59 that is generally vertical, i.e., more vertical than horizontal. The surface 59 is exposed to, and at least partially defines, the interior compartment 22. In the embodiment depicted, the cavity 58 has a generally rectangular cross-sectional shape.

Figure 2:
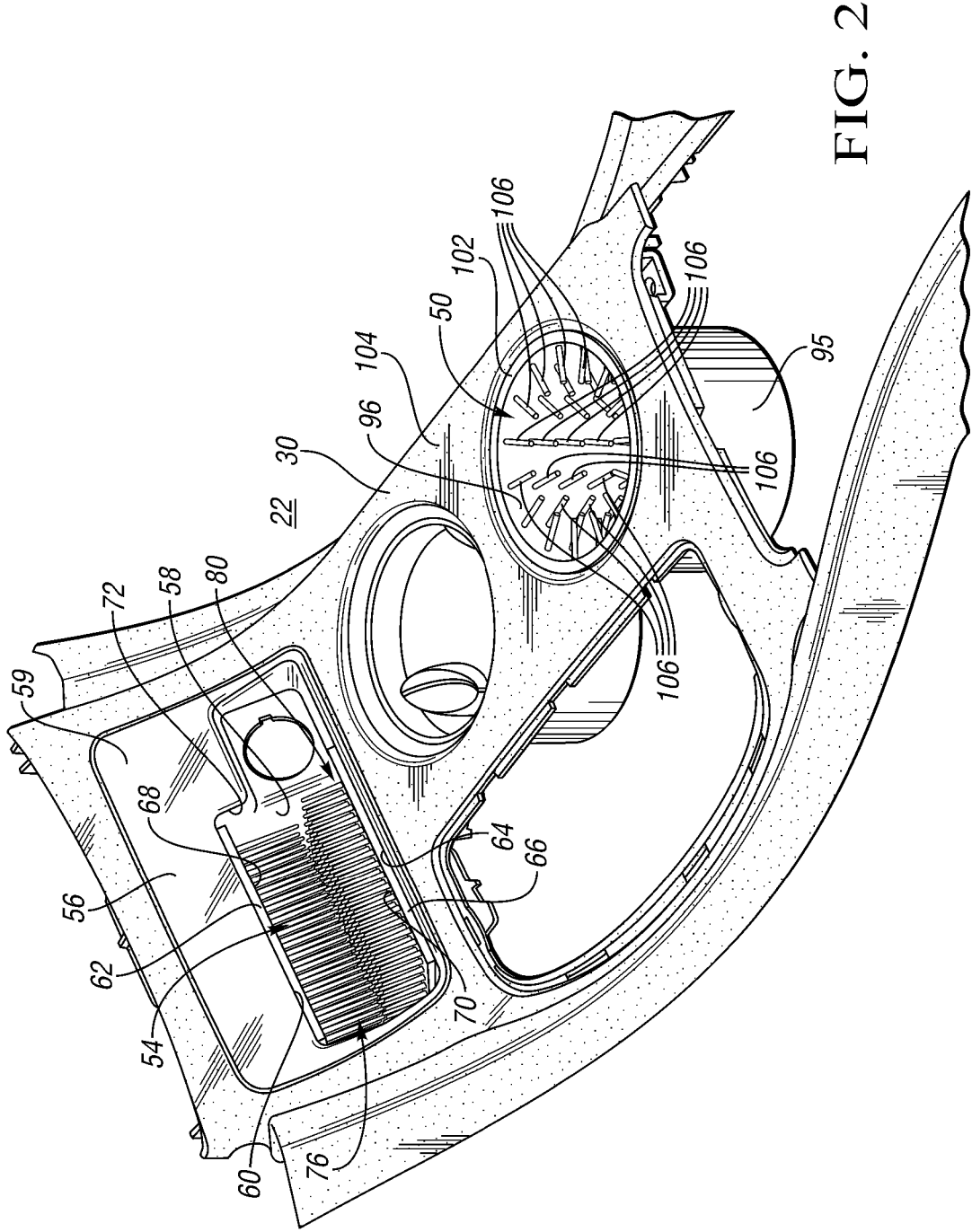
FIG. 2 is a schematic, perspective view of a portion of the center console of FIG. 1 that defines two storage compartments.
Figure 3:
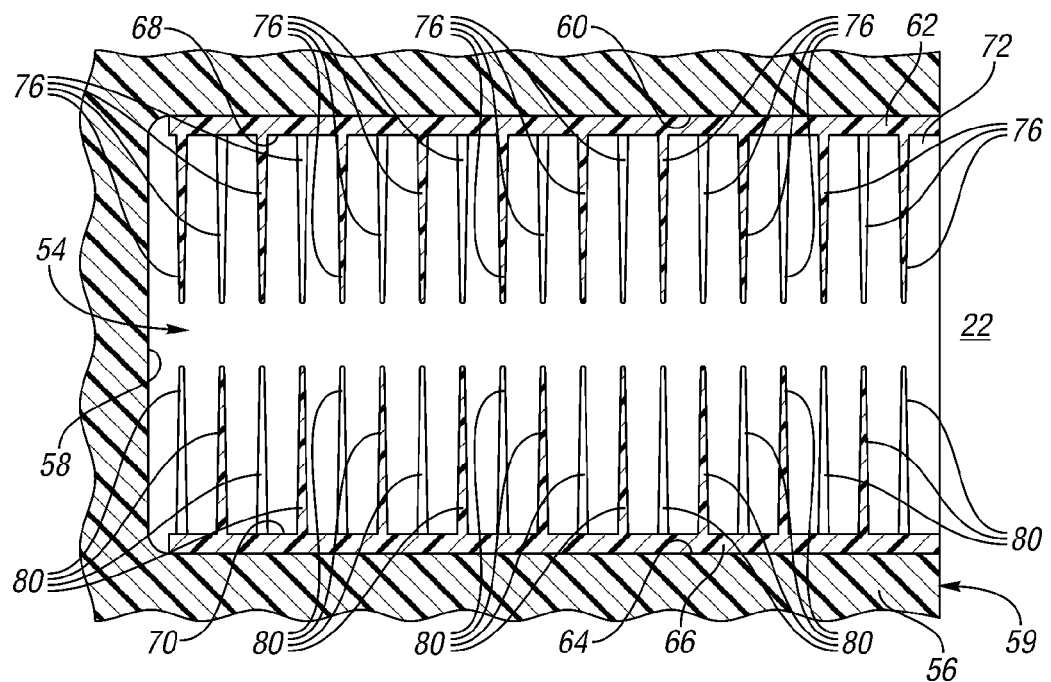
FIG. 3 is a schematic, sectional, side view of one of the storage compartments of FIG. 2.

Referring to FIGS. 2 and 3, the member 56 includes an upper surface 60 that defines the upper extent of the cavity 58. A first member, i.e., upper elastomeric member 62, is attached to the upper surface 60. The member 56 also includes a lower surface 64 that defines the lower extent of the cavity 58. A second member, i.e., lower elastomeric member 66, is attached to the lower surface 64. The upper elastomeric member 62 defines a first surface 68 that faces generally downward. The lower elastomeric member 66 defines a second surface 70 that faces generally upward and is generally parallel to the surface 68. The surfaces 68, 70 at least partially define the storage compartment 54 therebetween. The storage compartment 54 is at least partially coextensive with the cavity 58. The member 56 defines an opening 72 to the cavity 58 and to the storage compartment 54. The storage compartment 54 is accessible from the interior compartment 22 via the opening 72. The opening 72 in the embodiment depicted is at the interface of the outer surface 59 of member 56 and the cavity 58.

Accordingly, the member 56 and the elastomeric members 62, 66 constitute structure having at least one surface 68, 70 defining a storage compartment 54 and defining an opening 72 through which the storage compartment 54 is accessible from the interior compartment 22. The upper elastomeric member 62 includes a first plurality of flexible fingers or protuberances 76 that extend from the surface 68 into the storage compartment 54. The lower elastomeric member 66 includes a second plurality of flexible fingers or protuberances 80 that extend from the surface 70 into the storage compartment 54.

The first plurality of flexible protuberances 76 extend in a first direction from the first surface 68, and the second plurality of flexible protuberances 80 extend in a second direction opposite the first direction from the second surface 70. More specifically, in the embodiment depicted, the protuberances 76 are generally vertically oriented, i.e., they extend perpendicularly from surface 68 in a downward direction. The protuberances 80 are generally vertically oriented, i.e., they extend perpendicularly from surface 70 in an upward direction toward the protuberances 76 and surface 68.

Figure 4:
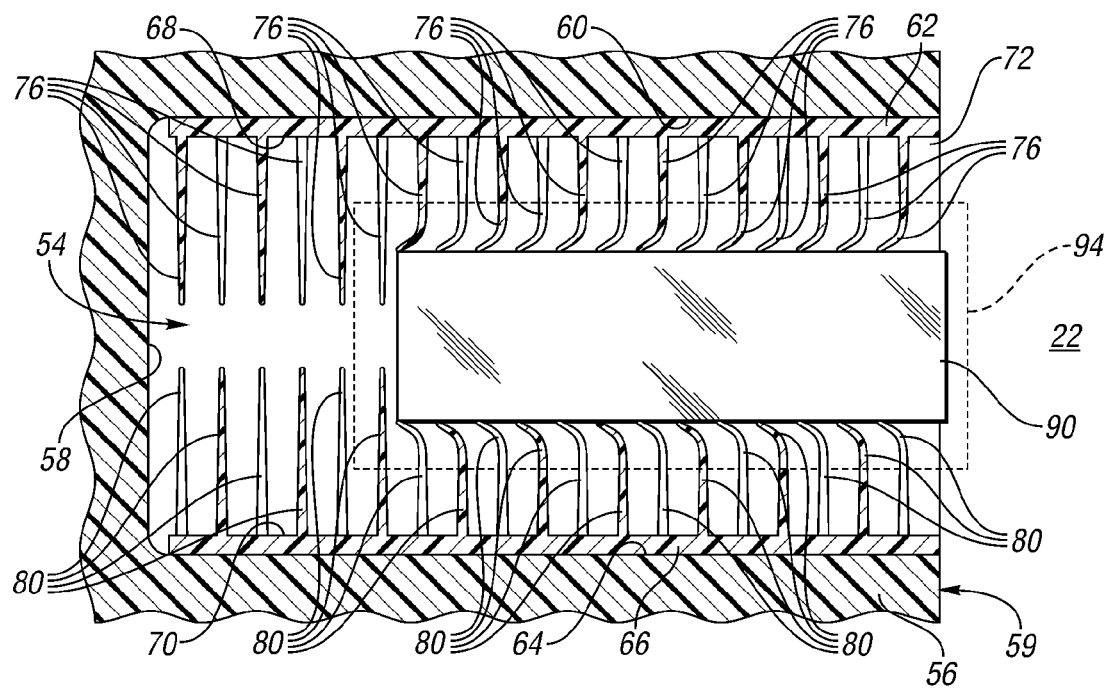
FIG. 4 is a schematic, sectional, side view of the storage compartment of FIG. 3 with an object being stored therein.

Referring to FIG. 4, when an object 90 is inserted into the storage compartment 54 through the opening 72, the object 90 contacts and deforms some of the protuberances 76, 80 such that the protuberances 76, 80 follow the contour of the outer surface of the object 90. The protuberances 76, 80 deform elastically, and thus exert a reaction force on the object 90. The lower protuberances 80 exert an upward force on the object 90, while the upper protuberances 76 exert a downward force on the object 90. Some of the protuberances 76, 80 are displaced laterally, and thus exert lateral forces on each side of the object 90. The protuberances 76, 80 thereby support and grip the object 90 to retain the object 90 in place inside the storage compartment 54. Thus, for example, the protuberances 76, 80 prevent or minimize movement of the object 90 relative to the vehicle body 14 during movement of the vehicle 10.

The protuberances 76, 80 enable objects of various sizes to be stored and retained within the storage compartment 54. Thus, for example, an object 94, which is larger than object 90, could also be placed within the storage compartment 54 and be supported and retained by protuberances 76, 80. Accordingly, the storage compartment 54 provides storage for objects of various sizes and orientations within a single compartment. It should be noted that the elastic characteristics of the protuberances 76, 80 also isolate the object 90 from vibrations. The protuberances 76, 80 are resilient, i.e., they return to their original form after being bent, compressed, or stretched. Accordingly, when the object 90 is removed from the storage compartment 54, the protuberances 76, 80 will automatically return to their original, unstressed shapes shown in FIG. 3.

In the embodiment depicted, all of the protuberances 76 and the first surface 68 are formed from a single piece of elastomeric material. Similarly, all of the protuberances 80 and the second surface 70 are formed from a single piece of elastomeric material. However, and within the scope of the claimed invention, the protuberances may comprise multiple pieces of material, such as when it may be desirable for protuberances to have different durometers.

Referring again to FIG. 2, the center console 30 includes structure 95 that includes an inner surface 96 that defines storage compartment 50. Storage compartment 50 is configured as a cup holder. The inner surface 96 is generally cylindrically shaped, as shown in FIG. 2, or frustoconical. Accordingly, the storage compartment 50 defined by the inner surface 96 is either generally cylindrically shaped or frustoconically shaped, with a circular cross-section to accommodate most beverage containers.

The structure 95 also defines an opening 102 to the storage compartment 50 through which the storage compartment 50 is accessible from the interior compartment 22. The opening 102 is formed in surface 104, which is exposed to, and at least partially defines, the interior compartment 22. The surface 104 is generally horizontal, i.e., more horizontal than vertical, and therefore the storage compartment is upwardly-open. A plurality of elastic fingers or protuberances 106 extend from the surface 96 into the storage compartment 50. In the embodiment depicted, the protuberances 106 extend radially into the storage compartment 50, and are evenly spaced apart from one another along the circumference of the compartment 50 and axially along the compartment 50. The protuberances 106 function in the same manner as the protuberances 76, 80 in FIGS. 2 and 3 to retain cups of differing sizes within the compartment 50.

It should be noted that the quantity and density of protuberances shown in the Figures are merely exemplary and may vary within the scope of the claimed invention. Similarly, the shape and length of the protuberances shown are merely exemplary and may vary within the scope of the claimed invention. Also, protuberances having different shapes, lengths, orientations, and durometers may be used within a storage compartment within the scope of the claimed invention. For example, a storage system may include a first plurality of protuberances extending from a surface and a second plurality of protuberances extending from the surface. The first plurality of protuberances may be longer and have a lower durometer than the second plurality of protuberances.

It should also be noted that, although the interior compartment 22 shown in the embodiment depicted is a passenger compartment, other interior compartments may also be employed within the scope of the claimed invention. For example, the interior compartment may be a cargo compartment, such as the rear portion of a minivan or SUV, a trunk, etc. Also, within the scope of the claimed invention, a flap, door, etc. (not shown) may be used to selectively cover the opening 72.

While the best modes for carrying out the invention have been described in detail, those familiar with the art to which this invention relates will recognize various alternative designs and embodiments for practicing the invention within the scope of the appended claims.

The invention claimed is:

1. A storage system comprising:
   structure having at least one surface defining a storage compartment and defining an opening through which the storage compartment is accessible; and
   a plurality of flexible protuberances extending from said at least one surface into the storage compartment;
   wherein said at least one surface includes a first surface and a second surface;
   wherein the plurality of flexible protuberances includes a first plurality of flexible protuberances and a second plurality of flexible protuberances; and
   wherein the first plurality of flexible protuberances extend in a first direction from the first surface; and
   wherein the second plurality of flexible protuberances extend in a second direction opposite the first direction from the second surface.

2. The storage system of claim 1, wherein the first plurality of flexible protuberances are formed from a first single piece of material; and
   wherein the second plurality of flexible protuberances are formed from a second single piece of material.

3. The storage system of claim 1, wherein the first plurality of flexible protuberances and the second plurality of flexible protuberances are substantially parallel to one another.

4. The storage system of claim 1, wherein the first and second pluralities of flexible protuberances are resilient.

5. A vehicle comprising:
   a vehicle body defining an interior compartment;
   structure having at least one surface defining a storage compartment and defining an opening through which the storage compartment is accessible from the interior compartment; and
   a plurality of flexible protuberances extending from said at least one surface into the storage compartment;
   wherein said at least one surface includes a first surface and a second surface;
   wherein the plurality of flexible protuberances includes a first plurality of flexible protuberances and a second plurality of flexible protuberances; and
   wherein the first plurality of flexible protuberances extend in a first direction from the first surface; and
   wherein the second plurality of flexible protuberances extend in a second direction opposite the first direction from the second surface.

6. The vehicle of claim 5, wherein the first plurality of flexible protuberances are formed from a first single piece of material; and
   wherein the second plurality of flexible protuberances are formed from a second single piece of material.

7. The vehicle of claim 5, wherein the first plurality of flexible protuberances and the second plurality of flexible protuberances are substantially parallel to one another.

8. The vehicle of claim 5, wherein the first and second pluralities of flexible protuberances are resilient.

9. The vehicle of claim 5, wherein the structure defines a generally vertical surface; and
   wherein the opening is formed in the generally vertical surface.

* * * * *